United States Patent
Hasemann et al.

(10) Patent No.: US 11,397,090 B2
(45) Date of Patent: Jul. 26, 2022

(54) METHOD AND SYSTEM FOR GENERATING ADAPTIVE ROUTE GUIDANCE INFORMATION (71) Applicant: TomTom Navigation B.V., Amsterdam (NL)

(72) Inventors: Henning Hasemann, Berlin (DE); Massimo Guggino, Berlin (DE); Michal Slonina, Berlin (DE); Michael Wyrzykowski, Barcelona (ES)

(73) Assignee: TOMTOM NAVIGATION B.V., Amsterdam (NL)

(*) Notice: Subject to any disclaimer, the term of this patent is extended or adjusted under 35 U.S.C. 154(b) by 286 days.

(21) Appl. No.: 16/317,185

(22) PCT Filed: Aug. 1, 2017

(86) PCT No.: PCT/EP2017/069381
§ 371 (c)(1),
(2) Date: Jan. 11, 2019

(87) PCT Pub. No.: WO2018/024703
PCT Pub. Date: Feb. 8, 2018

(65) Prior Publication Data
US 2019/0293440 A1 Sep. 26, 2019

Related U.S. Application Data (60) Provisional application No. 62/369,715, filed on Aug. 1, 2016.

(51) Int. Cl.
G01C 21/34 (2006.01)
G06N 20/00 (2019.01)
G01C 21/36 (2006.01)

(52) U.S. Cl.
CPC ...... *G01C 21/3446* (2013.01); *G01C 21/3641* (2013.01); *G01C 21/3655* (2013.01); *G06N 20/00* (2019.01); *G01C 21/3484* (2013.01)

(58) Field of Classification Search
CPC .......... G01C 21/3446; G01C 21/3641; G01C 21/3655; G01C 21/3484; G06N 20/00
See application file for complete search history.

(56) References Cited

U.S. PATENT DOCUMENTS 8,275,540 B2 * 9/2012 Downs ................. G08G 1/0104
701/118
2014/0214322 A1 7/2014 Tsimhoni et al.
(Continued)

OTHER PUBLICATIONS

Tchankue, Patrick & Wesson, Janet & Vogts, Dieter. (2013). Using Machine Learning to Predict the Driving Context whilst Driving. 10.1145/2513456.2513472. (Year: 2013).*
(Continued)

*Primary Examiner* — Jeff A Burke
*Assistant Examiner* — Joshua Alexander Garza
(74) *Attorney, Agent, or Firm* — Park. Vaughan, Fleming & Dowler LLP (57) ABSTRACT A method for generating guidance information is disclosed, which uses one or more machine learning algorithms to continually adapt and update a version of a model used to generate guidance instructions based on feedback data received from one or more users, such that the instructions generated by the model better fit the expectations or behaviour of the user or users. The method can be performed on a mobile navigation device, such that the model is adjusted to suit the needs of a single user. Alternatively, the method can be performed on a server based on feedback data from a plurality of users, and the updated model, once generated, transmitted to a plurality of mobile navigation devices to replace the existing model.

15 Claims, 6 Drawing Sheets (56) References Cited

U.S. PATENT DOCUMENTS

| | | | | |
|---|---|---|---|---|
| 2015/0276421 A1* | 10/2015 | Beaurepaire | ....... | G01C 21/3629 |
| | | | | 701/400 |
| 2015/0330805 A1* | 11/2015 | Cho | ................ | G01C 21/3484 |
| | | | | 701/428 |
| 2016/0051167 A1* | 2/2016 | Saha | .................... | A61B 5/1123 |
| | | | | 702/141 |
| 2016/0275102 A1* | 9/2016 | Haro | ....................... | G06F 16/29 |
| 2016/0341564 A1* | 11/2016 | Cheng | ................ | G01C 21/3641 |
| 2017/0032480 A1* | 2/2017 | Wong | ..................... | G06Q 50/01 |
| 2021/0404833 A1* | 12/2021 | Padegimaite | ...... | G01C 21/3608 |

OTHER PUBLICATIONS

Search Report for International Application No. PCT/EP2017/069381 dated Aug. 1, 2017.

Anonymous, Decision Tree Learning—Wikipedia, Jul. 28, 2016, XP055416159, retrieved from the Internet at https://en.wikipedia.org/w/index.php?title=Decision tree_learning&01did=731861806, retrieved on Oct. 16, 2017.

\* cited by examiner

| Imp. | Feature | |
|---|---|---|
| 0.842 | $\alpha_0$ | Angle of target arc |
| 0.046 | $\alpha_1$ | Angle of target arc after fixed distance |
| 0.039 | | Following priority? |
| 0.013 | | Only choice in this direction? |
| 0.012 | | Number of bifurcation choices |
| 0.011 | $\beta_-$ | Angle to next arc left |
| 0.006 | $\beta_+$ | Angle to next arc right |

Figure 6

METHOD AND SYSTEM FOR GENERATING ADAPTIVE ROUTE GUIDANCE INFORMATION

CROSS-REFERENCE TO RELATED APPLICATIONS

The present application is a National Stage of International Application No. PCT/EP2017/069381, filed on Aug. 1, 2017, and designating the United States, which claims benefit to U.S. Patent Application 62/369,715 filed on Aug. 1, 2016. The entire content of these applications is incorporated herein by reference.

FIELD OF THE INVENTION

This invention relates to methods and systems for generating a version of a model comprising one or more decision trees that is arranged to generate instructions for guiding a user along a predetermined route through a network of navigable elements within a geographic area. The invention further extends to methods and systems for generating navigational instructions, and also extends to navigation devices and servers arranged to generate navigational instructions.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function. A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

During navigation along a calculated route, it is usual for such PNDs to provide visual and/or audible navigational instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

Figure 1:
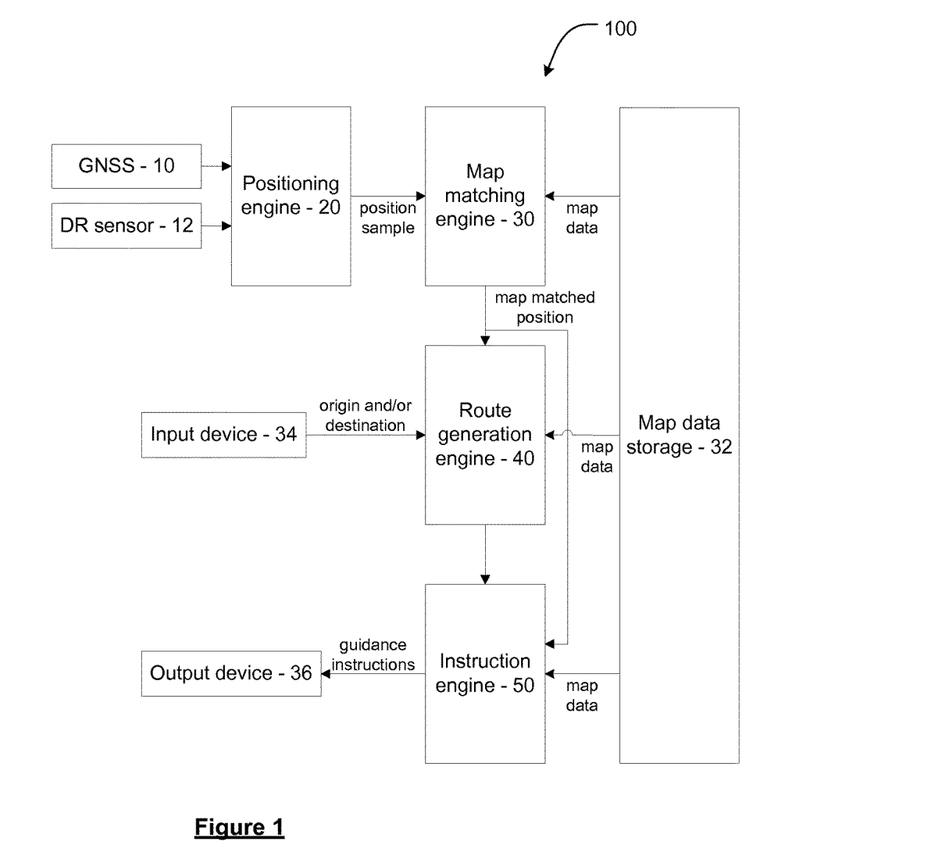
FIG. 1 shows an exemplary functional design of a navigation device including an instruction generation engine.

FIG. 1 shows an exemplary functional design of a navigation system 100. In the system, data is received and processed by a positioning engine (e.g. software module) 20 from at least one of a GNSS sensor 10 and a DR sensor 12 to continually output position data. This position data, i.e. each position sample, includes at least a set of geographic coordinates, such as latitude and longitude, but will also typically include information such as heading, speed and distance traveled (since from the previous position sample). The position samples are input to a map matching engine 30, which has access to digital map data in a storage means 32, and outputs, for each position sample, a corresponding map matched position, e.g. as data identifying a segment of the digital map and an offset from the head or tail node. The map matched position is received by one or more client devices or software modules 40, for example, a route generation engine 40 for use in determining a route from an origin, such as a current position, to a destination, e.g. as received from an input device 34, and an instruction engine 50 for use in determined instructions to guide a user along the predetermined route. The guidance information from the instruction engine 50 is passed to an output device 36, such as a display and/or speaker, for provision to the user.

Devices of the type described above provide a reliable means for enabling users to navigate from one position to another. However, the Applicant has realised that there remains a need for improved methods and systems for providing a user with navigational instructions to guide a user along a chosen route.

SUMMARY OF THE INVENTION

In accordance with a first aspect of the invention there is provided a method of generating a version of a model comprising one or more decision trees that is arranged to generate instructions for guiding a user along a predetermined route through a network of navigable elements within a geographic area, the navigable elements being represented by segments of an electronic map connected at nodes, wherein at least some of the nodes are representative of decision points in the network of navigable elements, the method comprising:

receiving feedback data from one or more navigation devices, wherein said feedback data is in respect of instructions at one or more decision points generated by a current version of said model used by the one or more navigation devices when following a predetermined route through the network of navigable elements;

using the feedback data to generate a plurality of datasets, each dataset comprising: data indicative of segments associated with traversing a portion of a predetermined route through a decision point; and desired instructions to be generated by a version of the model to guide the user along the portion of the predetermined route through the decision point;

using one or more machine learning algorithms to generate an updated version of said model based on the generated plurality of datasets; and providing said updated version of said model to at least one navigation device for use in generating instructions to guide a user of the at least one navigation device along a predetermined route through the network of navigable elements.

The present invention extends to a system for carrying out a method in accordance with any of the aspects or embodiments of the invention herein described. Thus, in accordance with a second aspect of the invention there is provided a system for generating a version of a model comprising one or more decision trees that is arranged to generate instructions for guiding a user along a predetermined route through a network of navigable elements within a geographic area, the navigable elements being represented by segments of an electronic map connected at nodes, wherein at least some of the nodes are representative of decision points in the network of navigable elements, the system comprising:

means for receiving feedback data from one or more navigation devices, wherein said feedback data is in respect of instructions at one or more decision points generated by a current version of said model used by the one or more navigation devices when following a predetermined route through the network of navigable elements;

means for using the feedback data to generate a plurality of datasets, each dataset comprising: data indicative of segments associated with traversing a portion of a predetermined route through a decision point; and desired instructions to be generated by a version of the model to guide the user along the portion of the predetermined route through the decision point;

means for using one or more machine learning algorithms to generate an updated version of said model based on the generated plurality of datasets; and means for providing said updated version of said model to at least one navigation device for use in generating instructions to guide a user of the at least one navigation device along a predetermined route through the network of navigable elements.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The methods of the present invention may be carried out by a mobile device. The mobile device has a memory and a set of one or more processors. Such a device may be a dedicated navigation device, e.g. having any of the features described in the background section above. Such a device may be a portable navigation device, or an integrated in-vehicle device. However, in other embodiments the mobile device may be any suitable mobile device, such as a mobile phone or tablet device, running appropriate software. Generally, the mobile device will have position determining functionality. Alternatively the methods of the present invention may be carried out by a server. Other embodiments are envisaged in which the methods of the present invention are performed by a combination of a server and a mobile device. Accordingly, the system of the present invention may comprise a mobile device and/or a server arranged to perform the steps described.

By applying machine learning approaches to the generating of navigational (or guidance) instructions, the version of the model used to generate the instructions may be continually adapted, i.e. updated, using one or more machine learning algorithms based on feedback data to better fit the expectations or behaviour of users. For example, the machine learning feedback system allows the navigational instructions to be tailored to a particular user, or group of users, or for a particular situation, in order to reduce the risk of user error. This addresses a number of fundamental problems associated with current known techniques for generating guidance instructions using handcrafted decision logic. In particular, with handcrafted decision logic it is difficult to maintain and additionally many assumptions need to be made about the expectations of users. However, these assumptions, by definition, cannot apply to all users, or even all groups of users. Furthermore, since the decision logic is in-built, it is not easy to incorporate any feedback, and not practical to incorporate user-specific feedback. By using a model that is continually retrained based on feedback data, the model is trained to adapt to the expectations of particular users, and the model is naturally updated or refined based on user feedback over time. The use of machine learning techniques thus provides a low cycle time for feedback to be incorporated into the model, and the capability for supporting a potentially very large user base, without the demand on the developers becoming unmanageable.

The idea behind the present invention is therefore to switch to using a machine learning algorithm or algorithms to generate new versions of the model, rather than using manually coded decision logic. As discussed in more detail below, the model comprises one or more decision trees. For example, different decision trees may be generated for different junction types or complexities. As the model is adapted in use, the form and/or content of the navigational instructions may also be adapted. For example, the model may modify or refine the type of instruction that is to be generated, the combination of map features that are referred to in the instruction, the timing of the instruction, the verbosity of the instructions, or whether an instruction is needed at all, etc.

In the present invention, each version of the model comprises one or more decision trees, wherein each node of a decision tree makes a decision, e.g. binary, ternary or other multi-way decision, as to a component and/or timing of an instruction at a decision point (or junction) of the navigable network, and wherein each decision tree can be of any depth as desired. Each version of the model is based on an electronic map, such that each decision that is to be made in the decision tree is based on data within the electronic map. The electronic map comprises a plurality of segments connected by nodes, and representing navigable elements of a navigable network in the area covered by the electronic map. The nodes connected by the segments of the electronic map may be indicative of real world nodes, e.g. intersections (or junctions) of elements of the navigable network (i.e. decision points), or artificial nodes, which may be introduced into an electronic map to provide anchors for segments which have at least one end which is not defined by a real world node. This may be useful to divide a segment extending between real world nodes in order to be able to associate different attributes with parts of that segment, such as different road characteristics e.g. speed limits, shape information, etc. While embodiments of the present invention are described with reference to navigable elements in the form of road segments, it should be realised that the invention may also be applicable to other navigable segments, such as segments of a path, river, canal, cycle path, tow path, railway line, or the like. For ease of reference these are commonly referred to as a road segment.

Each node of the electronic map is associated with position data, indicative of the real world position of the node, e.g. each node may be associated with position date indicative of a longitudinal and latitudinal position of the node. Accordingly, each segment has a bearing based on the position data of the nodes between which the segment extends, and thus, at a decision point, there will be an angular difference between the incoming and outgoing segments at the node based on the bearing of each segment. It will therefore also be appreciated that a segment is preferably directional, and may indicate that the segment is uni-directional (i.e. the navigable element represented by the segment can be traversed in only one direction) or bi-directional (i.e. the navigable element represented by the segment can be traversed in both directions).

The method may comprise the step of obtaining electronic map data from a map database for use in the method of generating the updated version of the model, and, in embodiments, when using the updated version of the model to generate instructions to guide a user along a predetermined route. The step of obtaining the electronic map may comprise requesting the data from a local or remote source.

In the method of present invention, feedback data is received from one or more navigation devices, wherein said feedback data is in respect of instructions at one or more decision points generated by a current version of said model used by the one or more navigation devices when following a predetermined route through the network of navigable elements. The feedback data can be indicative of the quality of instructions, e.g. whether an instruction at a decision point was in time and/or sufficiently clear to a user, such that the user was able to successfully navigate the decision point when following their predetermined route. For example, the feedback data can comprise data identifying a decision point of the navigable network (e.g. as represented by the electronic map) and data identifying that the instruction was incorrect or could be improved, either in terms of the constitute parts of the instruction and/or the timing at which the instruction is given relative to the decision point. The feedback data can be generated when traversing a predetermined route, e.g. through user interaction with the navigation device, such as a voice command, depression of a hard button, selection of a soft button (or virtual icon), etc. Additionally, or alternatively, the feedback data can be generated after having traversed a predetermined route.

The feedback data may additionally, or alternatively comprise positional data indicative of the movements of the one or more navigation devices with respect to time on the navigable network, and from which behaviour at a decision point can be inferred. For example, if the positional data indicates that a user took a wrong turn at a decision point, then it can be inferred that the instruction given for that decision point can be improved. The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc. The positional data used in accordance with the invention is collected from a plurality of devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable element in accordance with the present invention. However, in preferred embodiments all positional data is associated with temporal data, e.g. a timestamp.

The feedback data may be received from a single user, such that the updated version of model is tailored to the preferences of that user. For example, the feedback data may additionally, or alternatively, comprise data indicative of a user's personal network. The personal network of a user is a sub-network of the navigable network and includes those navigable elements (e.g. segments of the electronic map representative of such navigable elements) that have been traversed by the user in the past, e.g. that form regular or commuter routes. By using data indicative of the user's personal network as feedback, then a version of the model can be generated that is adapted to generate fewer, or no, instructions, or less verbose instructions for those decision points on routes on which the user regularly travels.

In other embodiments, the feedback data may be received from a plurality of users, such that the updated version of the model takes into account the preferences of the plurality of users.

In the present invention, the feedback data is used to generate a plurality of datasets, each dataset comprising: data indicative of segments associated with traversing a portion of a predetermined route through a decision point; and desired instructions to be generated by a version of the model to guide the user along the portion of the predetermined route through the decision point. The data indicative of segments associated with traversing a portion of a predetermined route through a decision point comprises the incoming segment to and outgoing segment from the decision point forming the predetermined route, and can further comprise at least one or more other outgoing segments from the decision point, and may, in other embodiments, and depending on the complexity of the junction, can comprise additional segments before or after the decision point. The data may additionally comprise other properties associated with the segments and/or decision point, such as the angle of the manoeuvre being made at the decision point, the angle between segments, the number of outgoing segments, etc. One or more or all of the plurality of datasets can be generated directly from the feedback data, i.e. the feedback data contains all the information needed to generate the dataset. In other embodiments, one or more or all of the plurality of datasets can be generated indirectly from the feedback data, e.g. with the feedback data indicating the decision point or junction at which current instructions are poor, but with the desired instructions for the decision point being determined manually by developers.

The generated plurality of datasets are then used as an input to one or more machine learning algorithms to generate an updated version of the model. The one or more machine learning algorithms may comprise a decision tree learning algorithm. It has been found that decision trees are particularly suitable for implementing the techniques of the present invention. Decision tree learning algorithms are generally very fast to learn and evaluate. Furthermore, by their nature, decision trees can provide valuable information to developers in a form that can easily be understood. For example, where a single part of the decision tree results in a split in behaviour between two user groups (with one group preferring a first instruction type and the other group preferring a second instruction type), this will show up as an impure node, and may be flagged up accordingly to developers. As will be appreciated, the updated version of the model can differ from the previous version in a number of different ways, such as one or more of: (i) the content of an instruction; (ii) the timing at which an instruction is output to a user; (iii) the verbosity of an instruction; and (iv) the presence of an instruction, i.e. whether the instruction is to be given at all.

The updated version of said model is then provided to at least one navigation device for use in generating instructions to guide a user of the at least one navigation device along a predetermined route through the network of navigable elements. The step of providing the updated version of the model can comprise transmitting the updated version of the model from a server where the new version of the model was determined to at least one mobile navigation device remote from the server. In such embodiments, the new version of the model replaces the existing version of the model on the device, such that when instructions are next generated for a predetermined route they are generated using the updated version of the model. The step of providing the updated version of the model can comprise, in embodiments where the machine learning algorithms creates a new version of the model on the same computing device where the version of the model is used to generate instructions, providing the updated version of the model to another software component, such as the instruction engine. An example of this latter embodiment is a portable or embedded navigation device that generates a new version of the model based on feedback data only from the user of the navigation device, such that the instructions issued by the device are specific to the behaviour and habits of that specific user.

In some embodiments, the method further comprises receiving, e.g. from a route generation engine, route data comprising a plurality of segments of the electronic map representative of a predetermined route through the network of navigable elements, and using the route data with the updated version of the model to generate instructions to guide a user along the predetermined route. As will be appreciated, the method, in these embodiments, further comprises accessing the electronic map to obtain information about segments and/or decision points needed to generate the instructions from the model. The model is preferably used to generate one or more instructions for each decision point. Where the route contains a plurality of decision points, as is typically the case, the model generates a respective set of one or more navigational instructions associated with each of the decision points along the route, and ordered accordingly. The navigational instructions are generally generated in advance, before a trip starts, and are then provided to the user as the user approaches the decision point. The current position of the user may be determined based on position determining means within the device, with the output of the instructions to the user being triggered by the current position indicating that the user is approaching a particular decision point. The device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

The instructions may be output to the user in any suitable manner. Typically, the navigational instructions may be displayed audibly and/or visually. However, the navigational instructions may also be provided haptically, or by any combination of audible, visual and haptic instructions.

As will be appreciated, the method of the present invention is preferably performed a number of successive times as new feedback data is received, such that a number of versions of the model are determined. In other words, the method is an iterative process.

It will be appreciated that the methods in accordance with the present invention may be implemented at least partially using software. It will thus be seen that, when viewed from further aspects and in further embodiments, the present invention extends to a computer program product comprising computer readable instructions adapted to carry out any or all of the method described herein when executed on suitable data processing means.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to a method substantially as described herein in relation to of any of the aspects or embodiments of the invention.

Regardless of its implementation, a navigation device used in accordance with the present invention may comprise a processor, memory, and digital map data stored within said memory. The processor and memory cooperate to provide an execution environment in which a software operating system may be established. One or more additional software programs may be provided to enable the functionality of the device to be controlled, and to provide various other functions. A navigation apparatus of the invention may preferably include GPS (Global Positioning System) signal reception and processing functionality. The device may comprise one or more output interfaces by means of which information may be relayed to the user. The output interface(s) may include a speaker for audible output in addition to the visual display. The device may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described, by way of example only, with reference to the accompanying Figures, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Navigation systems, such as PNDs, provide guidance functionality wherein, given a valid route, the navigation system generates navigational instructions to the user to ensure that the user correctly follows the route. For example, when approaching a junction, an instruction may be given for the user to "turn left". These instructions are typically given to the user audibly and/or visually, but instructions may also be provided in a haptic manner, or in any combination of these manners. In general, an instruction may be provided for each decision point along the route, such that when a user receiving navigational guidance, e.g. from a PND, approaches a junction or other decision point the PND provides the user with a navigational instruction to allow them to correctly traverse the predetermined route. The PND, or other navigation system, is thus provided with an instruction engine that is arranged to determine e.g. what instructions are to be given to the user, and when these instructions are to be given. In other words, the instruction engine has to determine all the places along the route (e.g. crossing, junctions, highway exits) where the user may need guidance in order to make the right choice. These places are generally termed "decision points". At such decision points, a driver usually has to make a manoeuvre or take an action (e.g. "turn left", "bear right", "at the roundabout, take the $3^{rd}$ exit", etc.) and so the instruction engine has to accurately describe all of these actions. The output of the instruction engine is thus a set of navigational instructions wherein each instruction describes a respective action associated with each decision point, with the navigational instructions order according to their position along the route, such that they are presented to the user in order, as the user arrives at or near to each decision point. In its simplest form, a navigational instruction may be provided as a single message to the user, sent at an appropriate time. However, it is also contemplated that each navigational instruction may include multiple messages. For example, for each decision point, a navigational instruction may include an optional early warning message (e.g. "After 2 km, take the exit right"), followed by an instruction message (e.g. "In 200 m, take the exit right") and, directly before the decision point, a confirmation message (e.g. "Take the exit right"). The navigational instructions may be triggered by the current position of the user along the route, which may be determined using GPS or other GNSS data. The instruction engine may further comprise a control system for deciding when and which messages to send at each decision point. For example, if an early warning for one decision point would overlap with the instruction message for the preceding decision point, potentially causing confusion, the instruction engine may decide not to issue an early warning message for that decision point.

Figure 2A:
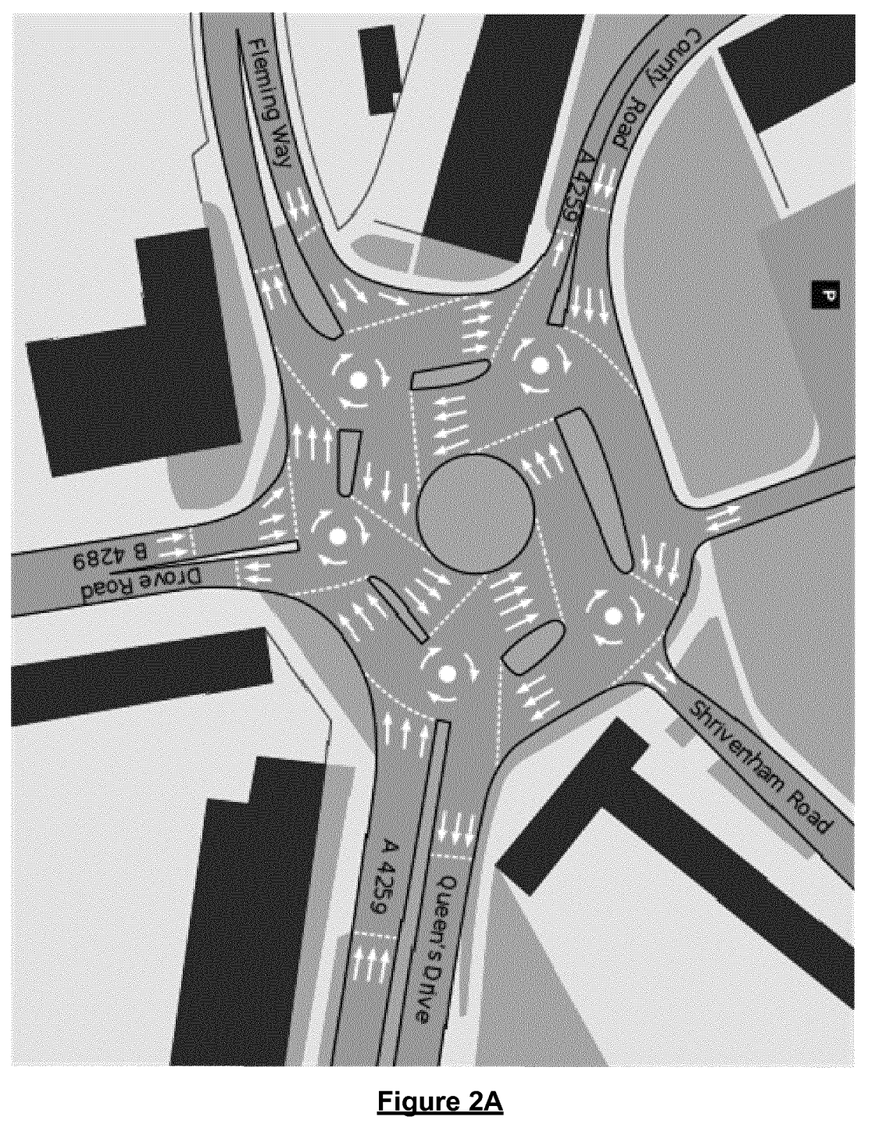
FIGS. 2A and 2B show by way of example two junctions in the United Kingdom where a user might require navigational instructions.
Figure 2B:
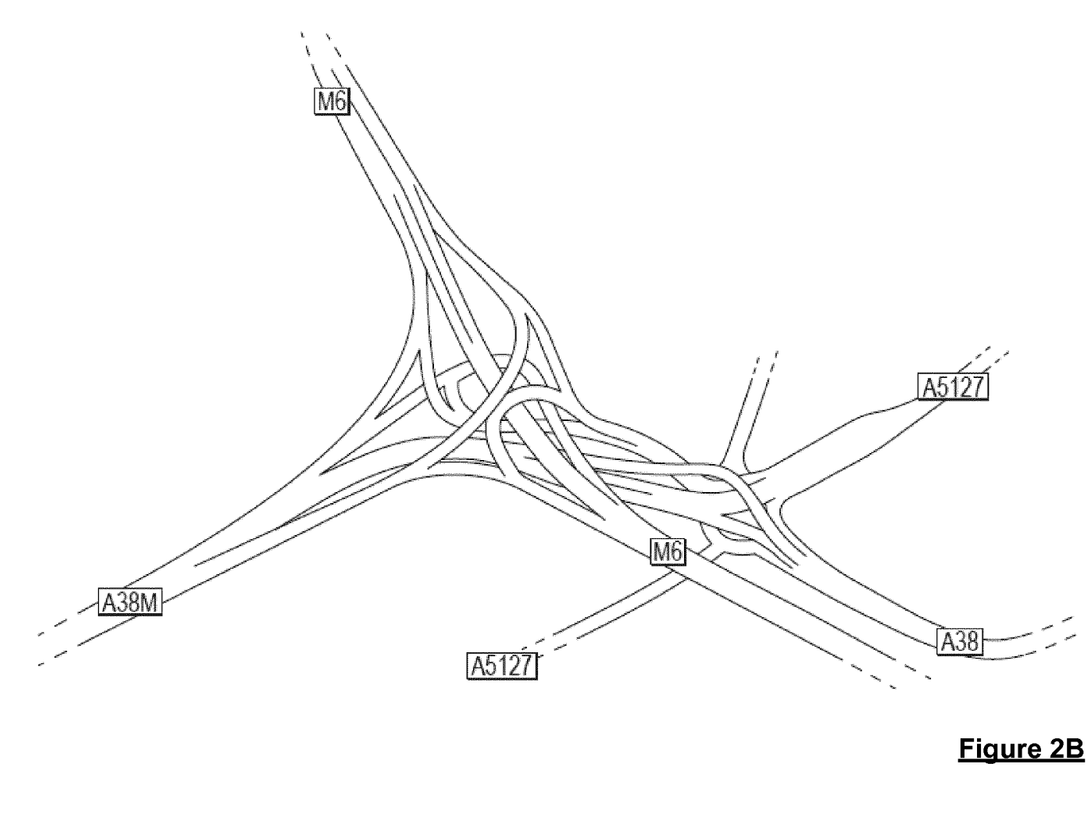

By way of illustrating some of the difficulties associated with generating suitable navigational instructions, FIGS. 2A and 2B show two examples of real junctions in the United Kingdom that a user may have to traverse. FIG. 2A shows the so-called Magic Roundabout in Swindon, while FIG. 2B shows Spaghetti Junction in the Gravelly Hill area of Birmingham. The junctions shown in FIGS. 2A and 2B are very different to each other, but both very complex. Where these junctions are located on a route along which a user is being navigated, the user will therefore need to receive clear and easily understood navigational instructions in order to stay on the correct route. The most suitable form of the instructions for the two junctions may be different. Indeed, this may generally be the case, as most junctions, or other decision points, are different, and therefore require different, or even different presentations of, instructions in order for a user to correctly interpret them. Even junctions that are superficially similar may be perceived differently by users, e.g. where the line of sight for approaching one junction is obscured.

In known systems, the instruction engine contains inbuilt decision logic for generating the navigational instructions. That is, in known systems, the decision logic is manually coded by an external developer and is pre-installed in the instruction engine prior to sale. Although the heuristics for the inbuilt decision logic in known systems are fine-tuned, it is difficult to maintain inbuilt decision logic that is suitable for a large number of different types of junction, particularly while keeping the amount of code and the required computational power within practical limits. A more fundamental problem is that any inbuilt decision logic must necessarily make various assumptions about the expectations and behaviour of drivers. This is complicated by the fact that these expectations are not necessarily consistent among different drivers and might vary with cultural background or even personal preference. Furthermore, any potential problems with the inbuilt decision logic in known systems can only be fixed by a process of feedback and bug fixing, and then implemented e.g. via global software or hardware upgrade. This is a lot of work, and the bug fixing takes significant time to be implemented, if it is even implemented at all. Moreover, this type of bug fixing still does address the fundamental problems mentioned above.

Figure 3A:
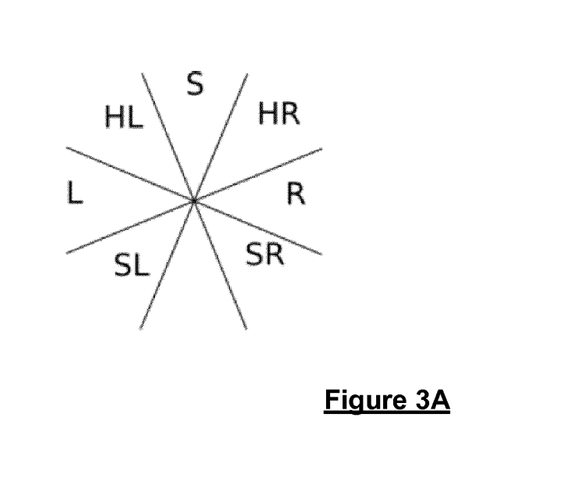
FIGS. 3A and 3B illustrate a problem of how navigational instructions may be perceived differently by different users.

As mentioned above, the navigational instructions are commonly implemented in terms of decision logic based heuristics such as "If there are no options, don't give an instruction" or "If turning angle is in range (−120°,−60°) then 'Turn Left'". Due to imperfections in map data representation and peculiarities in road designs such heuristics are typically also extended to gather an understanding of the junction itself. For instance, this may mean finding out whether a particular road segment is in the reverse direction of another road segment in order to determine whether changing between these road segments requires making a U-turn. In such a case, a developer might assume an even distribution of angular sectors for turn direction categories as shown in FIG. 3A. However, it has been recognised that different users may perceive these same instructions differently, and that different instructions may therefore be appropriate for different users even for the same junction. Similarly, even where two junctions are superficially of the same type, it may be that different junctions still require different instructions, or instructions presented in a different way, to minimise the risk of user error.

Figure 3B:
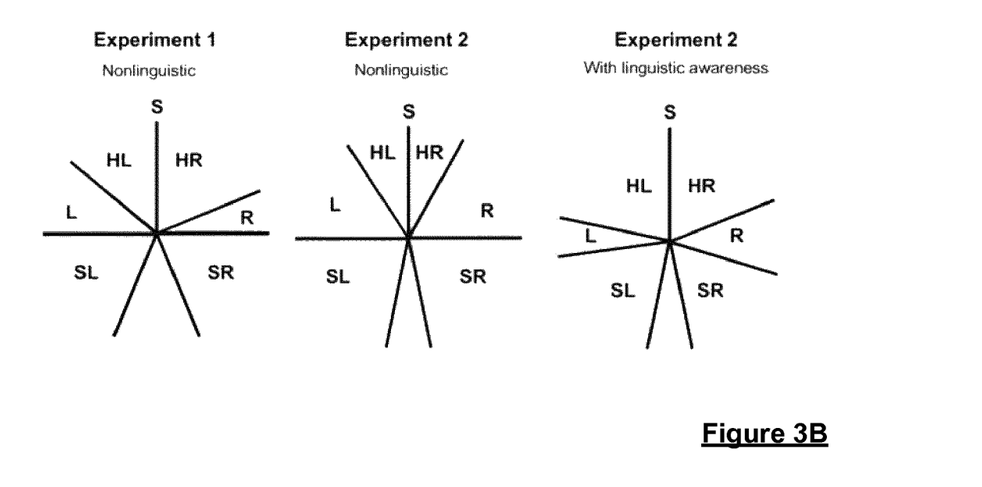

For example, where a navigational instruction is provided as an instruction to "turn left", or particularly to "make a sharp left turn", the perception of these instructions may be different for different users. That is, one user's perception of a "sharp" turn, may be different to another's. This is illustrated by FIG. 3B, which shows some experimental data reproduced from the paper of Alexander Klippel and Daniel R. Montello entitled "Linguistic and nonlinguistic turn direction concepts", published in Spatial Information Theory, 8th International Conference, COSIT 2007, Melbourne, AU, Sep. 19-23, 2007, Proceedings, pp 354-372. Here, human perception of directions such as straight ahead (S), half left (HL), left (L), sharp left (SL), half right (HR), right (R) and sharp right (SR) are analysed, and it was recognised that the perception of the ranges of angles associated with these instructions differed depending on the circumstances, such that a model assuming an even distribution of angular sectors for different turn direction categories, as shown in FIG. 3A, may be inaccurate, or at least inappropriate for some users. The perception of a given instruction may depend on cultural preferences, i.e. may be common to a group of users, for example, within a particular country. However, generally, the perception of a given instruction may vary between individuals. Because of these differences in perception, even of the same navigational instructions, a certain navigational instruction may not always be easy to understand and may not be understood consistently, from user to user, or from junction to junction. That is, a single navigational instruction may not be appropriate for every user or for every junction type. It is not practical using current navigational guidance systems to account for this, as it would involve a very high computational and storage burden.

In recognition of these problems, the Applicant has developed a novel technique for generating navigational instructions that is capable of tailoring the instructions, or the presentation of the instructions, to a particular user, or a particular junction, such that the instruction engine is capable of automatically adapting to quirks of the user, quirks of particularly decision points, or various cultural or personal preferences.

Figure 4:
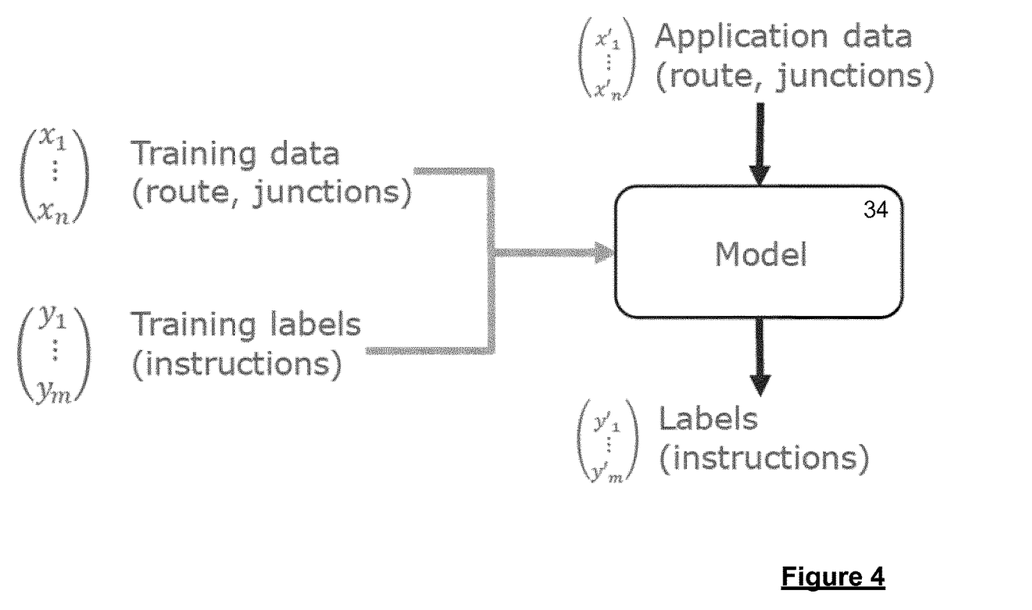
FIG. 4 shows schematically the concept underlying the techniques described herein.

The idea underlying this technique is schematically illustrated in FIG. 4. Referring to FIG. 4, the instruction engine implements a model 34 that receives as input application data describing the route which is being traversed (i.e. "route data") and the locations of decision points along that route (i.e. from "map data"). Based on this input data, the model 34 generates a set of navigational instructions associated with the inputted route and map data such that a user being navigated along the route is correctly guided at each decision point. In order to continually refine or modify the model 34 over time, such that the generated navigational instructions may be adapted to a particular user or situation, new versions of the model 34 are repeatedly generated using a machine learning algorithm that is based on feedback on the generated navigational instructions (generally "training data"). That is, the model is refined or modified over time by an iterative process of supervised machine learning. The use of machine learning approaches in this way creates a system that allows the feedback or other training data relating to the generated instructions to be provided and utilised so as to improve the navigational guidance. The machine learning algorithm generally evaluates the training data in order to modify the existing or create new models for generating navigational instructions. By refining the model in this way, the model adapts over time to provide navigational instructions that are tailored in form and/or content based on the training data. For example, the training data may allow the model 34 to adapt to a particular user or group or users' preferences, or driving behaviour, or on the behaviour of other users traversing the same decision points. The navigational instructions may thus be tailored to a user, or group of users, or to specific decision points along the route. Thus, for example, if, based on the set of navigational instructions generated by an initial version of the model, it is found that a user consistently misinterprets or does not follow the navigational instructions, this information may be provided as training data to the machine learning algorithm, which may in turn refine the model 34 to generate additional or to change the form of the navigational instructions to reduce the likelihood of user error in the future. For example, the model may be refined to provide instructions at an earlier point in time.

Figure 5:
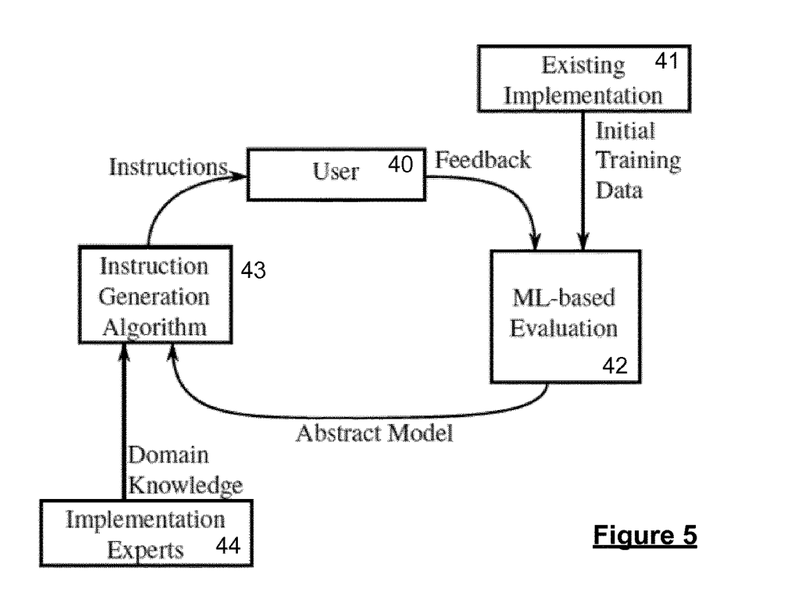
FIG. 5 shows an example of an embodiment of the present invention.

An example of a process according to embodiments of the invention will now be described with reference to FIG. 5, which shows how the generation of navigational instructions may be continuously improved by user feedback by employing a model using machine learning algorithms. The result of the process illustrated in FIG. 5 is that a user 40 is provided with navigation instructions relating to a predetermined route along which they are travelling. In general the route may be predetermined using various suitable route planning algorithms, as are known in the art. The route generally comprises a series of decision points, wherein each decision point is associated with one or more navigational instruction(s) for guiding the user along the pre-determined route. For instance, a decision point may be a junction along the route, wherein the instruction is to "turn left", in order to stay on the pre-determined route.

The navigational instructions are generated by an instruction engine, which may be provided as part of a navigational device, such as a PND, or may be implemented, at least on part, on an external server. The instruction engine receives, as input, data reflective of the route and of the map, and hence of the decision points along the route, and generates instructions for display to the user according to a particular model. The instructions may be displayed to user 40 audibly and visually, and the output of the instruction engine may thus be a string that is ready for synthesis into appropriate visual or audio output for display to the user.

The instruction engine comprises a module for an instruction generation algorithm 43, and can, in embodiments, comprises a module for a machine learning algorithm 42. The machine learning algorithm 42 creates and/or refines the version of the model that is used to generate the instructions. The instruction generation algorithm or module 43 generates the instructions using the latest version of the model, and provides these in a suitable format for display to the user 40. The (abstract) model may further be combined with other information such as domain knowledge of the developers or algorithm designers 44 as it is fed into the instruction generation algorithm 43 in order to improve the instruction generation. The instruction engine and/or each module thereof generally comprise one or more processors for performing this functionality.

In an initial step, the machine learning algorithm 42 may be set up (or "bootstrapped") using a set of initial training data relating to an existing implementation of the model. The existing implementation may be code that has previously been handcrafted by a developer to generate sensible instructions, such as is used in the known systems described earlier. That is, the initial training data is not tailored to a particular user, but is generic and may be pre-installed. After being bootstrapped with a set of initial training data from the existing implementation, the machine learning algorithm 42 evaluates the initial training data to construct an initial model for instruction generation. This model is used, in turn, by the instruction generation algorithm or module 43 to generate and provide to the user 40 an initial set of navigational instructions. It is also contemplated that the system may be provided with an initial inbuilt model, rather than initial training data.

Once an initial bootstrapped version of the model is generated using the deterministic initial training data, a feedback process is used employing the machine learning algorithm 42 in order to adapt the model to change to fit users' demands. Over time, after a number of trips, feedback from one or more users is recorded. Drivers may report any junctions that they perceive to be handled un-intuitively. This may happen in an essentially online fashion via some specialized user interface or via bug reports after the trip. Additionally, instructions that are followed successfully by many users might be recorded as affirmative examples. The collected information is then transformed into {junction situation, expected instruction} pairs for input into the machine learning algorithm 42. The junction situation is the relevant parts of route information and map content that were used to generate a particular instruction. Apart from general properties of the route this resolves mostly to descriptions of several involved road stretches or arcs.

Once the model has been trained and re-learned, the re-learned model is in turn used to generate future instructions and so on. By using wireless communication and seamless consumer device updates, this system can in principle function in a seamless pipeline fashion, wherein the model is continuously updated on the or each user's end-device to better fit his or her expectations. In general, the training of the machine learning algorithm 42 may occur on a server, particularly where feedback is provided from multiple different users, and/or on the client device (e.g. the PND), particularly where feedback is provided from a single user.

A person skilled in the art will appreciate that various suitable models may be used for generating navigational instructions, and also that various suitable machine learning algorithms may be used to generate and refine the model over time. By way of illustration, in one exemplary approach, the model used to generate the navigational instructions comprises a decision tree, i.e. a series of if/else statements. The machine learning algorithm may accordingly use decision tree learning. In the context of the techniques described, it will be understood that a decision tree is a (usually binary) tree wherein each inner node represents a comparison of a single feature value against a fixed threshold, and wherein the leaf nodes represent distributions of class probabilities. Decision tree classification aims to construct a tree such that each leaf represents a clear preference for a single class. There are various known approaches for finding good heuristics for decision tree generation, including, but not limited to, ID3, C4.5 and CART, and these approximations are generally very fast to learn and evaluate. Moreover, due to their tree form, decision tree models are straight-forward to understand for human experts as they consist only of direct comparisons between features and threshold values. Thus, even after the model has been refined to better fit a particular user's expectations, it is relatively simple for a developer to then understand how the model has been changed. This may help the developer to better refine the initial model or initial training data for subsequent users. Another advantageous property of decision trees is that each tree node provides a purity value that may be used to identify contradictions in the data under the given features. For instance, if a group of users prefers a first instruction type in a given situation whereas another group of users prefers a second instruction type in the same situation, this will show as an impure node. In that case, the developer may decide to introduce an additional feature for distinguishing these user groups, e.g. by country, or have this part of the tree individually learned for each user with some sensible defaults.

A definition of the problem that is trying to be solved using machine learning techniques in embodiments of the present invention is as follows. As input dataset we denote any sequence of tuples $x_i=(R,a)$, where R is a description of a route and a is an arc index into R. As labels or classes $X= x_1 \ldots x_n$ for an input dataset X we denote a sequence $Y= y_1 \ldots y_n$ of the same length with descriptions of matching guidance instructions as elements. A classifier is a function $F(X,Y)$ that generates a model $M=F(X,Y)$ from input data and labels. M in turn is a function $M(x)$ that predicts classes for any input tuple x' (with x' not necessarily in X). For comparing different classifiers, we consider the misclassification rate, or loss as the probability of a wrong classification $I(F)=P(M(x) \neq y)$ for an input datum x with true class y.

Figure 6:
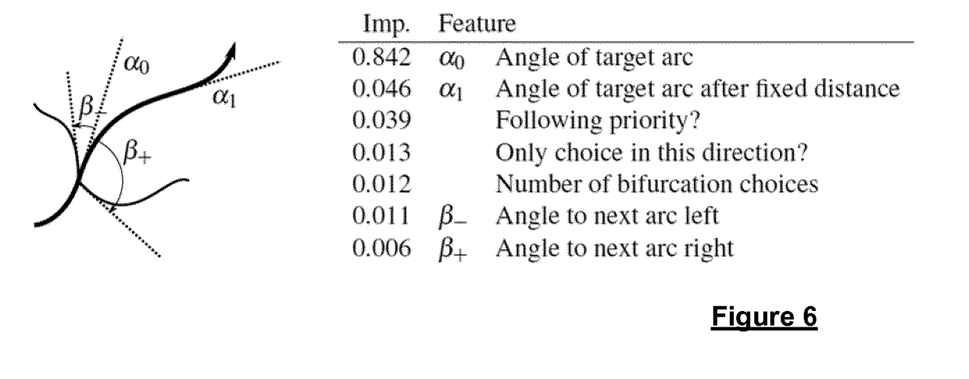
FIG. 6 shows how a simple junction may be evaluated using a decision tree model.

The manner in which a particular junction may be evaluated using a decision tree, will now be described referring to FIG. 6. FIG. 6 shows a list of features that may be used to describe a junction, ranked by order of their importance (as may e.g. be measured by the Gini Importance of each feature). The decision tree may make a comparison for each of these features in order to generate a suitable navigational instruction for that arc.

The junction is described generally in terms of three arcs (e.g. segments): the arc that the driver following the planned route is currently coming from, the arc that the user is going to enter, and potentially a third arc that is relevant for bifurcations and e.g. to decide on whether or not an instruction should be given at all. Each of these arcs may be described by a combination of parameters such as relevant angles, length, road type/class and various other flags. Thus, the most important feature in the example shown in FIG. 6 is the angle of the target arc, $\alpha_0$. FIG. 6 also lists the angle of the target arc after a certain distance, $\alpha_1$, and the angles to the next arcs left, $\beta-$, and right, $\beta+$. Additionally provided are several arc-independent features that may give information about the number of arcs involved in the crossing, certain angular distances and route-related properties such as number of instructions left in the set of navigational instructions before arrival. For instance, FIG. 6 lists the features of whether the route is "Following priority?", whether the route is the "Only choice in this direction?", and the "Number of bifurcation choices".

As discussed above, the decision tree(s) for each node can only compare a single feature dimension to a threshold value. Thus, it is necessary to provide useful algebraic feature combinations as input data to the decision tree. When generating navigational guidance instructions it often makes sense to compare the properties of different arcs in order to answer questions such as "Is arc A more to the right than arc B?", or "Does the road type change between arc A and arc B?". To allow these comparisons, the decision tree learning algorithm may be provided with the differences of the individual features of each arc with each other arc.

For large amounts of (possibly contradicting) updates or refinements to the model, it may be desirable, in embodiments, to consider the age of the historic travel data involved, and to automatically discard outdated information, e.g. especially where such data is contradicted by newer data. Techniques described in relation to the detection of concept drift may be used in this regard. Similarly, the process of updating or refining the model may be further automated to use found contradictions to distinguish general, cultural or personal preferences and to split appropriate sub-models. This information may be useful for developers, e.g. in improving the initial training data with which the initial model is bootstrapped.

Although embodiments of the present invention are described with reference to a car user (or driver) traversing a route defined by one or more road segments, it should be realised that the techniques described herein may also be applied to various other navigable segments, such as segments of a path, river, canal, cycle path, tow path, railway line, or the like. Thus, the user need not be a driver of a car, but may also be, for example, a pedestrian or cyclist receiving navigational instructions.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of generating a version of a model comprising one or more decision trees that is arranged to generate instructions for guiding a user along a predetermined route through a network of navigable elements within a geographic area, the navigable elements being represented by segments of an electronic map connected at nodes, wherein at least some of the nodes are representative of decision points in the network of navigable elements, the method comprising:

receiving feedback data from one or more navigation devices, wherein said feedback data is in respect of instructions at one or more decision points generated by a current version of said model used by the one or more navigation devices when following a predetermined route through the network of navigable elements;

using the feedback data to generate a plurality of datasets, each dataset comprising: data indicative of segments associated with traversing a portion of a predetermined route through a decision point; and instructions to be generated by a version of the model to guide the user along the portion of the predetermined route through the decision point;

using one or more machine learning algorithms to generate an updated version of said model based on the generated plurality of datasets, said updated version of said model including updates to some or all of the one or more decision trees, each decision tree including nodes associated with respective decision points in the electronic map, wherein specified feature dimensions are compared to respective threshold values at each node, and said updated version of said model configured to generate instructions for guiding users along predetermined routes based on route data describing the routes; and providing said updated version of said model to at least one navigation device for use in generating instructions to guide a user of the at least one navigation device along a predetermined route through the network of navigable elements.

2. The method of claim 1, wherein each of said one or more decision trees comprises a plurality of nodes, each node representing a decision as to a component and/or timing of an instruction to be generated at a decision point.

3. The method of claim 1, comprising obtaining electronic map data from a map database, and wherein said updated version of said model is generated based on the generated plurality of datasets and said obtained electronic map data.

4. The method of claim 1, wherein said feedback data comprises data identifying a decision point of the navigable network and data identifying that the instruction was incorrect or could be improved in terms of the constitute parts of the instruction and/or the timing at which the instruction is given relative to the decision point.

5. The method of claim 1, wherein the data indicative of segments associated with traversing a portion of a predetermined route through a decision point comprises data indicative of an incoming segment to and outgoing segment from the decision point forming the predetermined route and additional segments before and/or after the decision point.

6. The method of claim 1, wherein each dataset further comprises data indicative of one or more other outgoing segments from the decision point not associated with traversing the portion of the predetermined route though the decision point.

7. The method of claim 1, wherein the updated version of the model differs from the previous version of the model such that, when it used to generate instructions to guide a user of a navigation device along a predetermined route through the network of navigable elements, the instructions are different in one or more of: (i) the content of an instruction; (ii) the timing at which an instruction is output to a user; (iii) the verbosity of an instruction; and (iv) the presence of an instruction.

8. The method of claim 1, wherein said providing the updated version of the model to at least one navigation device comprises transmitting the updated version of the model from a server to a mobile navigation device remote from the server.

9. The method of claim 8, wherein the received updated version of the model replaces the existing version of the model on the mobile navigation device, and the method further comprises:

obtaining route data comprising a plurality of segments of the electronic map representative of a predetermined route through the network of navigable elements; and
using the route data with the updated version of the model to generate instructions to guide a user along the predetermined route.

10. The method of claim 8, wherein said feedback data is received from a plurality of navigation devices, and the updated version of said model is transmitted to a plurality of mobile navigation devices remote from the server.

11. The method of claim 1, further comprising:
obtaining route data comprising a plurality of segments of the electronic map representative of a predetermined route through the network of navigable elements; and
using the route data with the updated version of the model to generate instructions to guide a user along the predetermined route.

12. A system comprising one or more processors and a memory for storing a generated version of an electronic model, the model comprising one or more decision trees that is arranged to generate instructions for guiding a user along a predetermined route through a network of navigable elements within a geographic area, the navigable elements being represented by segments of an electronic map connected at nodes, wherein at least some of the nodes are representative of decision points in the network of navigable elements, the one or more processors being arranged to:
receive feedback data from one or more navigation devices, wherein said feedback data is in respect of instructions at one or more decision points generated by a current version of said model used by the one or more navigation devices when following a predetermined route through the network of navigable elements;
use the feedback data to generate a plurality of datasets, each dataset comprising: data indicative of segments associated with traversing a portion of a predetermined route through a decision point; and instructions to be generated by a version of the model to guide the user along the portion of the predetermined route through the decision point;
use one or more machine learning algorithms to generate an updated version of said model based on the generated plurality of datasets, said updated version of said model including updates to some or all of the one or more decision trees, each decision tree including nodes associated with respective decision points in the electronic map, wherein specified feature dimensions are compared to respective threshold values at each node, and said updated version of said model configured to generate instructions for guiding users along predetermined routes based on route data describing the routes; and
provide said updated version of said model to at least one navigation device for use in generating instructions to guide a user of the at least one navigation device along a predetermined route through the network of navigable elements.

13. The system of claim 12, wherein the system is a server, and the server is arranged to provide said updated version of said model to at least one navigation device by transmitting the updated version of the model from the server to a mobile navigation device remote from the server.

14. The system of claim 12, wherein the system is a mobile navigation device, and the navigation device is arranged to: obtain route data comprising a plurality of segments of the electronic map representative of a predetermined route through the network of navigable elements; and use the route data with the updated version of the model to generate instructions to guide a user along the predetermined route.

15. A non-transitory computer readable medium comprising instructions which, when executed by one or more processors of a system, cause the system to perform a method for generating a version of a model comprising one or more decision trees that is arranged to generate instructions for guiding a user along a predetermined route through a network of navigable elements within a geographic area, the navigable elements being represented by segments of an electronic map connected at nodes, wherein at least some of the nodes are representative of decision points in the network of navigable elements, the method comprising:
receiving feedback data from one or more navigation devices, wherein said feedback data is in respect of instructions at one or more decision points generated by a current version of said model used by the one or more navigation devices when following a predetermined route through the network of navigable elements;
using the feedback data to generate a plurality of datasets, each dataset comprising: data indicative of segments associated with traversing a portion of a predetermined route through a decision point and instructions to be generated by a version of the model to guide the user along the portion of the predetermined route through the decision point;
using one or more machine learning algorithms to generate an updated version of said model based on the generated plurality of datasets, said updated version of said model including updates to some or all of the one or more decision trees, each decision tree including nodes associated with respective decision points in the electronic map, wherein specified feature dimensions are compared to respective threshold values at each node, and said updated version of said model configured to generate instructions for guiding users along predetermined routes based on route data describing the routes; and
providing said updated version of said model to at least one navigation device for use in generating instructions to guide a user of the at least one navigation device along a predetermined route through the network of navigable elements.

* * * * *